(12) United States Patent
Summer

(10) Patent No.: US 7,135,846 B2
(45) Date of Patent: Nov. 14, 2006

(54) METHOD FOR IMPLEMENTING RADIATION HARDENED, POWER EFFICIENT, NON ISOLATED LOW OUTPUT VOLTAGE DC/DC CONVERTERS WITH NON-RADIATION HARDENED COMPONENTS

(76) Inventor: Steven E. Summer, 1 Roned Rd., Shirley, NY (US) 11967

( * ) Notice: Subject to any disclaimer, the term of this patent is extended or adjusted under 35 U.S.C. 154(b) by 47 days.

(21) Appl. No.: 10/989,147

(22) Filed: Nov. 15, 2004

(65) Prior Publication Data
US 2006/0104095 A1    May 18, 2006

(51) Int. Cl.
*G05F 1/565*    (2006.01)
(52) U.S. Cl. ...................... 323/284; 323/285
(58) Field of Classification Search ........ 323/282–286, 323/290, 234, 349, 265, 222, 266; 327/434, 327/536, 589, 333; 307/264, 482, 296.2
See application file for complete search history.

(56) References Cited

U.S. PATENT DOCUMENTS

| | | | | |
|---|---|---|---|---|
| 5,389,871 | A | * | 2/1995 | Otake .......................... 323/282 |
| 5,757,174 | A | * | 5/1998 | Ki ............................... 323/284 |
| 6,366,070 | B1 | * | 4/2002 | Cooke et al. ............... 323/284 |

* cited by examiner

*Primary Examiner*—Rajnikant B. Patel
(74) *Attorney, Agent, or Firm*—Stephen E. Feldman PC

(57) ABSTRACT

A method of producing an economical DC/DC converter that efficiently produces a relatively low output voltage and operates in a high ionizing radiation dose environment such as found in spacecraft and particle accelerator applications. That is, the converter comprises two P-channel FETs, a switching means for switching conductivity between the two P-channel FETs, and output means for outputting an output voltage. The output voltage being a step-down voltage that is unaffected by high-ionizing radiation such that is found in space or particle accelerators.

6 Claims, 3 Drawing Sheets

METHOD FOR IMPLEMENTING RADIATION HARDENED, POWER EFFICIENT, NON ISOLATED LOW OUTPUT VOLTAGE DC/DC CONVERTERS WITH NON-RADIATION HARDENED COMPONENTS

FIELD OF THE INVENTION

The object of this invention is a method of producing an economical DC/DC converter that efficiently produces a relatively low output voltage and that operates in a high ionizing radiation dose environment such as found in spacecraft and particle accelerator applications.

BACKGROUND OF THE INVENTION

DC/DC converters are electronic devices that use switching devices to transform voltage from one level into another level. Typically, the output voltage is regulated and protected against short circuits. The input and output potentials may be galvanically isolated from each other or, they may have a common galvanic connection, and so be non-isolated from each other.

DC-DC converters whose input is non-isolated from its output tend to be more power efficient (i.e., have less power loss) than isolated DC-DC converters.

Among many applications, these types of devices are used in spacecraft, satellites and in high energy physics instrumentation. In these specific applications, the DC/DC converters are subjected to many forms of radiation damage.

FETs (Field Effect Transistors) used for power switching are usually enhancement mode types. This means that they are normally non-conducting. When a gate voltage above a threshold is applied, the FET becomes conducting. FETs are available in two gate polarities; N channel and P channel.

DC/DC converters designed for general purpose use are usually constructed with N channel FETs because, for any given die size transistor, the N channel FET has a lower on resistance than a correspondingly sized P channel FET would have.

Presently available radiation tolerant DC/DC converters use specially designed radiation hardened N channel FETs for switching. The principal benefit of these parts is that the gate threshold voltage doesn't change much after being exposed to radiation. However, these parts have limited sources, are expensive and may have long lead times, leading to higher prices and longer delivery times for the radiation tolerant DC/DC converters that incorporate these types of parts.

Over the past several decades, many standard integrated circuits have been developed to provide drive signals for DC/DC converters and switching power supplies. Existing integrated circuits used to directly drive power transistors in DC/DC converter applications are designed to operate with N channel FETs.

When conventional non-radiation hardened N Channels FETs are used in applications where radiation is present, the application tends to fail at relatively low radiation levels because the gate threshold voltage of the N channel FET shifts more negatively, and ultimately falls close to zero. At this point, the N channel FET conducts current with little or no gate voltage applied. Therefore, the part is uncontrollable.

The gate threshold voltage of a conventional, non-radiation hardened P channel FET also shifts more negative as it is exposed to radiation. However, the initial threshold voltage is negative. Therefore, the gate threshold voltage never goes through a region where the FET is uncontrollable, it only goes from a negative value to a more negative value. Therefore, conventional P channel FETs could be more robust to total dose effects than conventional N channel FETs if the proper gate drive signal is provided.

SUMMARY OF THE INVENTION

When providing a gate drive signal, the gate drive signal must be sufficiently high in magnitude to saturate the drain to source channel. It must, however, not be so high that the gate to source breakdown voltage rating of the FET is exceeded. It is important to maximize the magnitude of the gate voltage signal, because the higher the signal magnitude is, the higher radiation dose the FET will tolerate and still work acceptably in the circuit.

Non-isolated DC-DC converters are basically three terminal devices, having an input terminal, an output terminal and a common terminal.

Non isolated DC-DC converters may be described as "buck" converters, or as "boost" converters. Buck converters generate an output voltage that is lower than the input voltage, while boost converters generate a voltage that is higher than the input voltage. In simplest form, the buck or boost converter uses a switch, such as an FET, a diode and an inductor. The buck and boost converters are topologically similar, but differ in grounding arrangements.

In order to obtain higher power efficiency, the diode in the non-isolated DC-DC converter is often replaced with a second switching element, typically a FET. The forward voltage drop of the diode is usually higher than the drop across the second FET, therefore power losses are lower. The FET must be switched in synchronism with the waveform that would appear across the diode. Therefore, DC-DC converters that use a second FET to perform the action of the diode are called synchronous rectification devices.

The schematic diagram shows a preferred embodiment of the invention. This circuit example operates from a voltage source of 11 VDC to 16 VDC, but nominally either 12 VDC or 15 VDC. By connecting various jumpers, the DC-DC converter may be configured as either a buck converter (step down) or boost converter (step up). In the boost converter connection, the output voltage is negative with respect to the common terminal, however measuring the voltage from the positive terminal to the output terminal reveals the boosted voltage.

DETAILED DESCRIPTION

Figure 1A:
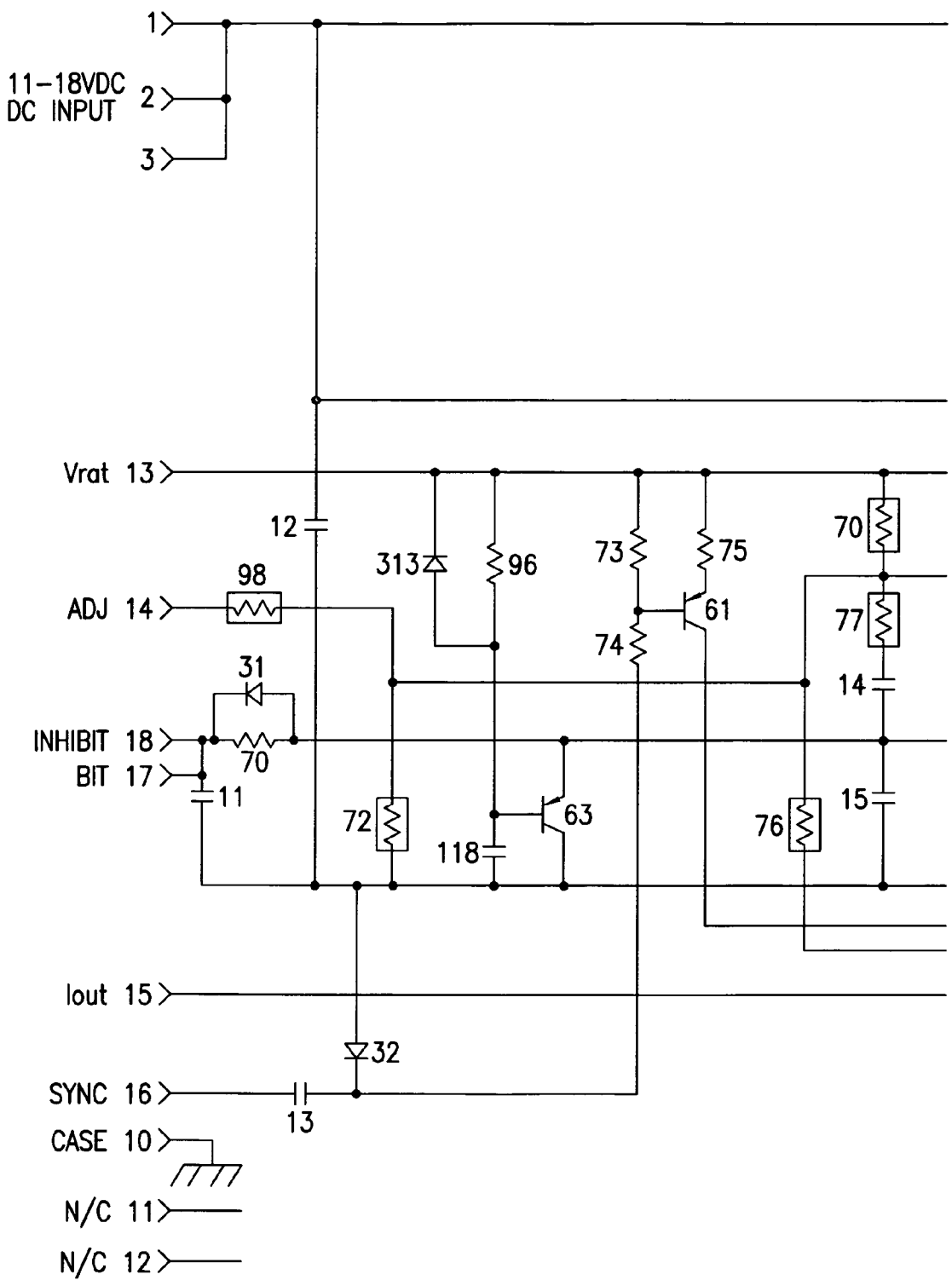
FIG. 1 is a block diagram of a circuit according to an embodiment of the present invention.
Figure 1B:
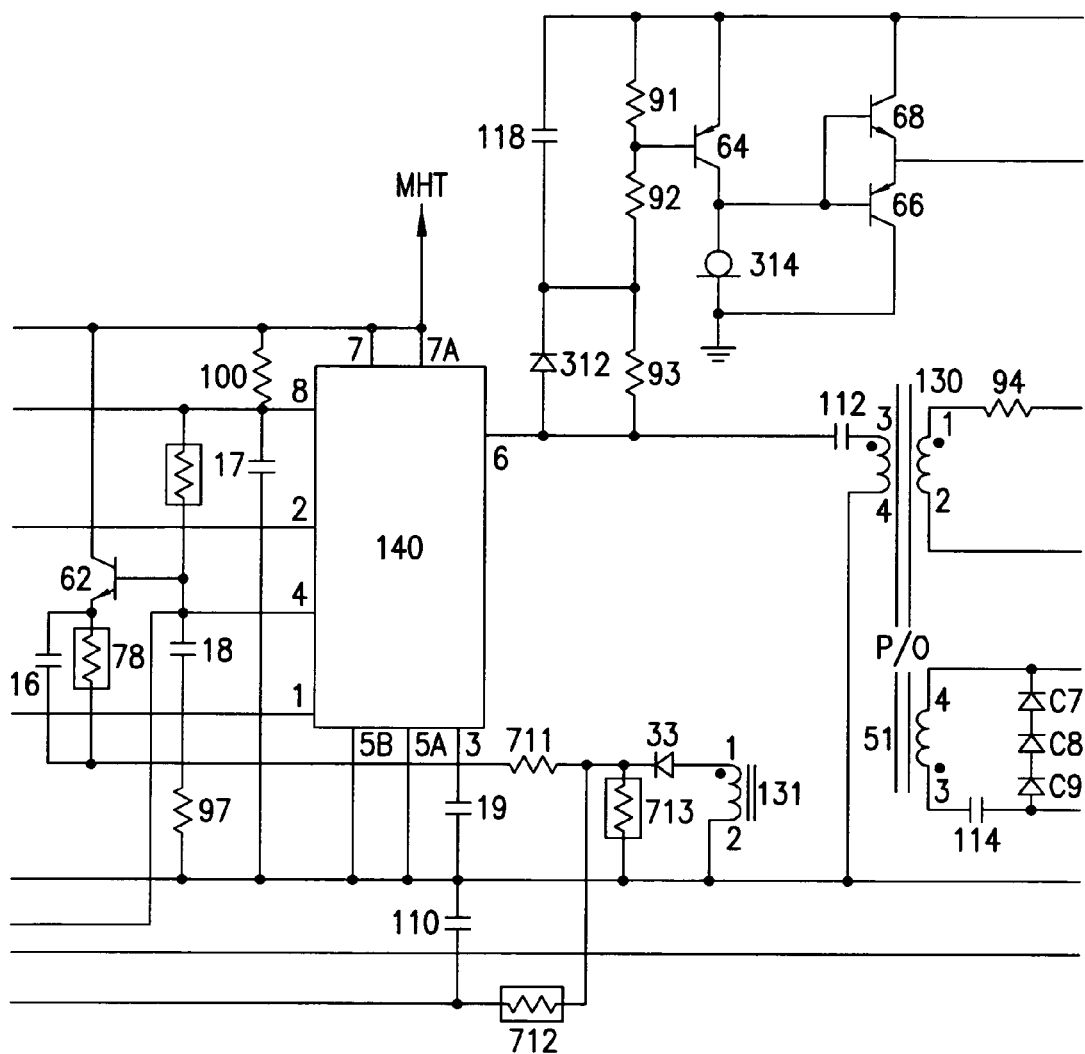
Figure 1C:
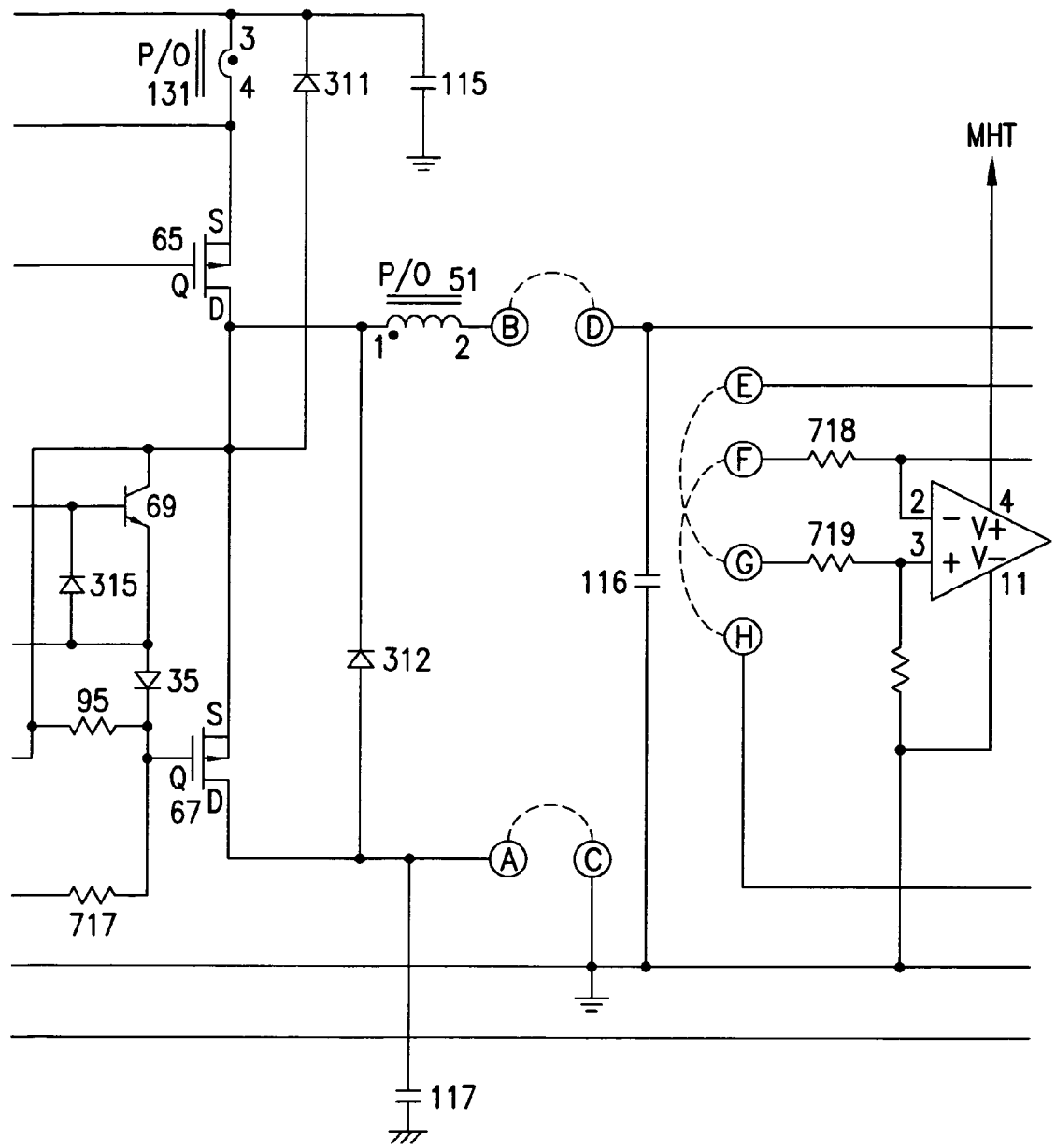

The following describes the operation of the circuit when connected as a buck converter (step down), wherein terminal B is tied to terminal D, terminal A is tied to terminal C and terminal F is tied to terminal E.

Positive input voltage is applied through current transformer primary 131 to the source of the P channel FET 65. When 65 conducts at the beginning of the switching cycle, positive input voltage is connected to terminal 1 of inductor 51. Current flows through 51 to the load, and also to filter capacitor 116.

When PWM circuit 140 switches, and FET 65 is made to turn off, 51 inductor current initially flows through diode 312. Approximately 100 nanoseconds later, P channel FET 67 conducts, connecting terminal 1 of 51 to the common ground. Since the voltage drop across 67 is lower than the forward voltage drop of 312, 51 inductor current flows through FET 67 when 67 conducts.

Near the end of the switching cycle, approximately 100 nanoseconds before the end, 67 is made to turn off, and 51 inductor current again flows through diode 312.

The duration of the conduction intervals of 65 and 67 is determined by pulse width modulator IC 140.

The output voltage of the DC-DC converter is scaled to a nominal 2.5 VDC level by resistors 71, 72, 704 and 76. This scaled voltage is connected to pin 2 of 140, which is the inverting terminal of a differential error amplifier. The positive terminal of the inverting error amplifier is connected to a stable 2.5 VDC reference within 140.

The amplified error between the pin 2 voltage and the internal 2.5 VDC reference appears on error amplifier output pin 1 of 140. 14, 15 and 77 are components used to stabilize the 140 feedback loop.

The output of 140's internal error is used to control the current flowing through FET 65, as monitored by current transformer 131. The output of the current transformer 131 is rectified by diode 33. 703 is the current transformer's burden resistor, which controls the scaling factor. 701 and 19 are filter components. The processed 65 current waveform is applied to pin 3 of PWM IC 140. There, it determines the output pulse width, in conjunction with the error amplifier voltage on pin 1 of 140.

Additional components connected around PWM IC 140 have the following functions. 700 is a resistor that provides current to the internal reference voltage on pin 8. 17 is a de-coupling capacitor. 79 and 18 determine the switching frequency of 140. 62, 16 and 78 feed a buffered ramp voltage to current input pin 3. This ramp voltage is used to provide additional stability to the feedback loop.

The "soft start" circuit is intended to make the output voltage rise at a controlled rate when power is initially applied to the input pins. This circuit consists of PNP bipolar transistor 63, capacitor 113, resistor 91 and diode 34. Upon initial application of power, capacitor 113 is discharged. The error amplifier of 140 is held down by the emitter of 63. As capacitor 113 exponentially charges through resistor 91, the base and emitter voltage of 63 rise accordingly. This slowly releases the clamp on pin 1 of 140, the error amplifier output, which produces a ramp up of output voltage.

Diode 34 discharges capacitor 113 when power is removed, preventing circumvention of the soft start feature when power is removed momentarily.

The operating status of the DC/DC converter may be monitored by measuring the output of the error amplifier circuit. Resistor 70 and capacitor 11 provide decoupling of the noise sensitive error amplifier output and the circuitry outside the DC/DC converter package. This filtered waveform is denoted "BIT", an acronym for built-in-test.

It is often desirable to disable the output of the DC-DC converter by applying a low level signal. This function is provided by diode 31, which allows grounding of the 140 error amplifier pin 1 when the external BIT/Inhibit pin is grounded.

The switching frequency may be synchronized to a signal applied to pin 13 of the overall unit. For the synchronizing signal, 13 acts as a DC voltage blocking capacitor, 32 as a DC restorer diode, 73 and 74 reduce the amplitude of the synchronizing signal. 75 controls the amplitude of the synchronizing signal derived by PNP bipolar transistor 61. When a synchronizing pulse is applied to the external sync pin, a corresponding current pulse is applied to timing capacitor 18. This causes an increase in oscillator frequency. By applying external sync waveforms of appropriate amplitude and frequency, the oscillator of 140 may be synchronized the frequency and phase of the external signal.

The pulse width modulated output of PWM IC 140 appears on pin 6. This signal is split into two signal paths.

On one path, the signal from pin 6 of 140 is applied to inverting PNP bipolar transistor 64. The signal from pin 6 is attenuated by resistors 708,709 and 90. Diode 313 and capacitor 118 form a preferential delay circuit the function of the preferential delay circuit is to make 64 respond more quickly to a (positive) rising waveform from 140 pin 6 and more slowly to a (negative) falling waveform. Transistor 66 and 68 are a bipolar PNP-NPN buffer and provide current gain for the drive signal which feeds the gate of P channel FET 65. Constant current diode 36 provides a constant current load for the collector of inverting transistor 64, allowing fast switching speed with minimal power dissipation.

The second path of 140 pin 6 is through DC blocking capacitor 112 to the primary winding of step down transformer 130. The secondary of 130 is connected to limiting resistor 705, then to bipolar NPN transistor 69. Diode 310 limits the reverse voltage applied to the base-emitter junction of 69.

The purpose of transistor 69 is to turn off P channel FET 67 before P channel FET 65 is turned on. Controlling this time relationship avoids the simultaneous conduction of the two FETs, which would otherwise create an undesirable, power dissipating "shoot through" current.

Diode 35 protects 69 from application of reverse collector-emitter voltage.

Gate drive voltage for P channel FET 67 is derived from a winding on inductor 51. The output of the winding is fed through DC blocking capacitor 114. Diodes 37, 38 and 39 are series connected to form a DC restorer circuit with the positive voltage approximately three diode drops more positive than the 67 source voltage.

Resistor 706 insures that the gate to source voltage of 67 is discharged at power turn off. Resistor 707 is a limiting resistor which allows efficient operation of turn off transistor 69.

In another embodiment, the following describes the operation of the circuit when connected as a boost converter (step up), wherein terminal B is tied to terminal C, terminal A is tied to terminal D and terminal G is tied to terminal E.

The boost converter actually generates output voltages of negative polarity, with reference to the output.

Positive input voltage is applied through current transformer primary 131 to the source of the P channel FET 65. When 65 conducts at the beginning of the switching cycle, positive input voltage is connected to terminal 1 of inductor 51. When 65 conducts, current flows through 51 to the common ground.

When PWM circuit 140 switches, and FET 65 is made to turn off, the voltage on the drain of 65 "flies back" to the negative output voltage, stored on output capacitor 116.

51 inductor current initially flows through diode 312. Approximately 100 nanoseconds later, P channel FET 67 conducts. Since the voltage drop across 67 is lower than the forward voltage drop of 312, 51 inductor current flows through FET 67 when 67 conducts.

Near the end of the switching cycle, approximately 100 nanoseconds before the end, 67 is made to turn off, and 51 inductor current again flows through diode 312.

The duration of the conduction intervals of 65 and 67 is determined by pulse width modulator IC 140.

The output voltage of the DC-DC converter is negative with respect to the common ground. Operational amplifier 141 is connected as a unity gain inverting amplifier, which mirrors the output voltage around ground potential. Equal value resistors 92 and 94 determine the unity inverting gain. Resistor 93 compensates for 141's input bias current.

Amplifier 141 is not used in the buck regulator configuration, since the output voltage is positive with respect to ground.

The output of 141 is scaled to a nominal 2.5 VDC level by resistors 71, 72, 704 and 76. This scaled voltage is connected to pin 2 of 140, which is the inverting terminal of a differential error amplifier. The positive terminal of the inverting error amplifier is connected to a stable 2.5 VDC reference within 140.

The amplified error between the pin 2 voltage and the internal 2.5 VDC reference appears on error amplifier output pin 1 of 140. 14, 15 and 77 are components used to stabilize the 140 feedback loop.

The output of 140's internal error is used to control the current flowing through FET 65, as monitored by current transformer 131. The output of the current transformer 131 is rectified by diode 33. 703 is the current transformer's burden resistor, which controls the scaling factor. 701 and 19 are filter components. The processed 65 current waveform is applied to pin 3 of PWM IC 140. There, it determines the output pulse width, in conjunction with the error amplifier voltage on pin 1 of 140.

Additional components connected around PWM IC 140 have the following functions. 700 is a resistor that provides current to the internal reference voltage on pin 8. 17 is a de-coupling capacitor. 79 and 18 determine the switching frequency of 140. 62, 16 and 78 feed a buffered ramp voltage to current input pin 3. This ramp voltage is used to provide additional stability to the feedback loop.

The "soft start" circuit is intended to make the output voltage rise at a controlled rate when power is initially applied to the input pins. This circuit consists of PNP bipolar transistor 63, capacitor 113, resistor 91 and diode 34. Upon initial application of power, capacitor 113 is discharged. The error amplifier of 140 is held down by the emitter of 63. As capacitor 113 exponentially charges through resistor 91, the base and emitter voltage of 63 rise accordingly. This slowly releases the clamp on pin 1 of 140, the error amplifier output, which produces a ramp up of output voltage.

Diode 34 discharges capacitor 113 when power is removed, preventing circumvention of the soft start feature when power is removed momentarily.

The operating status of the DC/DC converter may be monitored by measuring the output of the error amplifier circuit. Resistor 70 and capacitor 11 provide decoupling of the noise sensitive error amplifier output and the circuitry outside the DC/DC converter package. This filtered waveform is denoted "BIT", an acronym for built-in-test.

It is often desirable to disable the output of the DC-DC converter by applying a low level signal. This function is provided by diode 31, which allows grounding of the 140 error amplifier pin 1 when the external BIT/Inhibit pin is grounded.

The switching frequency may be synchronized to a signal applied to pin 13 of the overall unit. For the synchronizing signal, 13 acts as a DC voltage blocking capacitor, 32 as a DC restorer diode, 73 and 74 reduce the amplitude of the synchronizing signal. 75 controls the amplitude of the synchronizing signal derived by PNP bipolar transistor 61.

When a synchronizing pulse is applied to the external sync pin, a corresponding current pulse is applied to timing capacitor 18. This causes an increase in oscillator frequency. By applying external sync waveforms of appropriate amplitude and frequency, the oscillator of 140 may be synchronized the frequency and phase of the external signal.

The pulse width modulated output of PWM IC 140 appears on pin 6. This signal is split into two signal paths.

On one path, the signal from pin 6 of 140 is applied to inverting PNP bipolar transistor 64. The signal from pin 6 is attenuated by resistors 708, 709 and 90. Diode 313 and capacitor 118 form a preferential delay circuit the function of the preferential delay circuit is to make 64 respond more quickly to a (positive) rising waveform from 140 pin 6 and more slowly to a (negative) falling waveform. Transistor 66 and 68 are a bipolar PNP-NPN buffer and provide current gain for the drive signal which feeds the gate of P channel FET 65. Constant current diode 36 provides a constant current load for the collector of inverting transistor 64, allowing fast switching speed with minimal power dissipation.

The second path of 140 pin 6 is through DC blocking capacitor 112 to the primary winding of step down transformer 130. The secondary of 130 is connected to limiting resistor 705, then to bipolar NPN transistor 69. Diode 310 limits the reverse voltage applied to the base-emitter junction of 69.

The purpose of transistor 69 is to turn off P channel FET 67 before P channel FET 65 is turned on. Controlling this time relationship avoids the simultaneous conduction of the two FETs, which would otherwise create an undesirable, power dissipating "shoot through" current.

Diode 35 protects 69 from application of reverse collector-emitter voltage.

Gate drive voltage for P channel FET 67 is derived from a winding on inductor 51. The output of the winding is fed through DC blocking capacitor 114. Diodes 37, 38 and 39 are series connected to form a DC restorer circuit with the positive voltage approximately three diode drops more positive than the 67 source voltage.

Resistor 706 insures that the gate to source voltage of 67 is discharged at power turn off. Resistor 707 is a limiting resistor which allows efficient operation of turn off transistor 69.

In the preceding specification, the invention has been described with reference to specific exemplary embodiments thereof. It will however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. A buck converter for producing relatively low output voltages comprising:
    a first P-channel FET;
    a second P-channel FET;
    switching means for switching conductivity between the first P-channel FET and the second P-channel FET;
    output means for outputting an output voltage, said output voltage being a step-down voltage;
    scaling means for scaling the output voltage to a nominal level;
    control means for controlling a current flow though said first and second P-channel FET;
    determining means for determining an output pulse width;

soft-starting means for raising/lowering the output voltage at a controlled rate;

monitoring means for monitoring an operating status of the converter; and disabling means for disabling the output voltage of the converter, wherein the first P-channel FET, second P-channel RET and the output voltage are unaffected by high-ionizing radiation such that is found in space or particle accelerators.

2. The buck converter, as claimed in claim 1, further comprising:

synchronizing means for synchronizing a switching frequency.

3. The buck converter, as claimed in claim 2, further comprising:

protecting means for controlling a temporal relationship between the first and second FETs.

4. A boost converter for producing voltages of negative polarity comprising:

a first P-channel FET;

a second P-channel FET;

switching means for switching conductivity between the first P-channel FET and a second P-channel FET;

output means for outputting an output voltage, said output voltage being a step-up voltage, scaling means for scaling the output voltage to a nominal level;

control means for controlling a current flow through said first and second P-channel FET;

determining means for determining an output pulse width soft-starting means for rising the output voltage at a controlled rate;

monitoring means for monitoring an operating status of the converter; and disabling means for disabling the output voltage of the converter, wherein the first P-channel FET the second P-channel FET and the output voltage are unaffected by high-ionizing radiation such that is found in space or particle accelerators.

5. The boost converter, as claimed in claim 4, further comprising:

synchronizing means for synchronizing a switching frequency.

6. The boost converter, as claimed in claim 5, further comprising:

protecting means for controlling a temporal relationship between the first and second FETs.

* * * * *